(12) United States Patent
Peterson (10) Patent No.: US 11,493,069 B1
(45) Date of Patent: Nov. 8, 2022

(54) METHOD AND APPARATUS FOR SELECTIVELY ATTACHING A FIRST ITEM TO A SECOND ITEM

(71) Applicant: Blade-Tech Industries, Inc., Streetsboro, OH (US)

(72) Inventor: Jarett Peterson, Hudson, OH (US)

(73) Assignee: BLADE-TECH INDUSTRIES, INC., Streetsboro, OH (US)

(*) Notice: Subject to any disclaimer, the term of this patent is extended or adjusted under 35 U.S.C. 154(b) by 0 days.

(21) Appl. No.: 17/319,561

(22) Filed: May 13, 2021

(51) Int. Cl.
*F16B 5/06* (2006.01)
*B23P 19/04* (2006.01)

(52) U.S. Cl.
CPC ............ *F16B 5/0621* (2013.01); *B23P 19/04* (2013.01)

(58) Field of Classification Search
CPC ............................... F16B 5/0621; B23P 19/04
See application file for complete search history.

(56) References Cited

U.S. PATENT DOCUMENTS

| 4,536,166 A * | 8/1985 | Renger .................... A63H 3/28 446/298 |
| 5,238,438 A * | 8/1993 | Glickman ............ A63H 33/062 446/124 |
| 7,267,598 B2 * | 9/2007 | Glickman ............ A63H 33/086 446/124 |
| 9,511,487 B2 * | 12/2016 | Chen ..................... B25B 27/023 |
| 11,028,890 B2 * | 6/2021 | Tsai ........................ B23P 19/04 |
| 2016/0076608 A1 * | 3/2016 | Chen ..................... B60T 17/221 29/240 |
| 2017/0282338 A1 * | 10/2017 | Wang .................. F16D 65/0043 |
| 2020/0240482 A1 * | 7/2020 | Tsai ........................ B23P 19/04 |

* cited by examiner

*Primary Examiner* — Bayan Salone
(74) *Attorney, Agent, or Firm* — Emerson, Thomson & Bennett; Roger D. Emerson (57) ABSTRACT

An attaching apparatus includes a first member which has an axle member. A second member has a slot having a center plane and a cylindrical channel having a longitudinal centerline. The longitudinal centerline of the cylindrical channel lies within said center plane of said slot. The second member has a grip operatively associated with a spring and moveable between a first extended position and a second compressed position. The grip can selectively secure the axle member of said first member within the cylindrical chamber.

5 Claims, 15 Drawing Sheets

METHOD AND APPARATUS FOR SELECTIVELY ATTACHING A FIRST ITEM TO A SECOND ITEM

I. BACKGROUND

A. Field of the Invention

This invention generally relates to methods and apparatuses for selectively attaching and detaching, or engaging and disengaging, a first item to a second item, and more specifically to a simple apparatus and method for attaching and engaging attachments such as belt loops, holster backers, molle straps, magazine pouches, shoulder holster straps, belly bands, etc. to a holster or pouch without the use of screws and posts.

B. Description of Related Art

There are variety of apparatuses and methods for attaching one item, or article, to another item or article. The invention disclosed herein has wide applicability and not just to holsters for firearms but an attachment apparatus and method for attaching items to a firearm holster will be the primary context in which the invention is shown.

In the area of firearm holsters, attachments, such as for selectively attaching a belt loop or any other attachment to a holster or a magazine pouch, are often desired. However, the process of attaching and detaching these attachments usually involves the use of tools (such as a screwdriver) and fasteners, such as a screw or bolt and nut. This is sometimes burdensome and inconvenient, as the tools may not be conveniently available and the screw or bolt or nut may fall and be lost.

Therefore, what is needed is a new method and apparatus for easily attaching attachments to a holster. This invention, as disclosed herein, will provide numerous other advantages as will be readily understood by a person of skill in the art.

II. SUMMARY

According to some embodiments of this invention, an attaching apparatus has a first member which has an attaching apparatus which includes A first member, said first member having an axle member, said axle member having first, second and third portions, a diameter of said first and second portions being equal and being greater than a diameter of said third portion; and, a second member, said second member having slot, said slot having a center plane, said slot being defined by a first sidewall and second sidewall, said first and second sidewalls each lying in planes which are not parallel; said second member having a cylindrical channel having a longitudinal centerline, said longitudinal centerline of said cylindrical channel lying within said center plane of said slot, said second member having a grip operatively associated with a spring and moveable between a first extended position and a second compressed position, said grip operatively associated with said third portion of said axle member of said first member and biased by said spring to said first extended position, said spring being compressible by manually-generated forces to a second, compressed position, said cylindrical channel capable of selectively receiving said axle member A method of attaching a first item to second item, the method comprising the steps of providing a first member, said first member having an axle member; providing a second member, said second member having slot, a cylindrical channel, and a grip operative associated with a spring and moveable between a first extended position and a second compressed position; aligning said axle member of said first member with said slot; depressing said spring to said second depressed position, inserting said axle member into said cylindrical channel; releasing said spring so that it returns to said first extended position; positioning said grip onto said axle member to secure said axle member within said cylindrical channel.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION

Referring now to the drawings wherein the showings are for purposes of illustrating embodiments of the invention only and not for purposes of limiting the same, and wherein like reference numerals are understood to refer to like components, FIGS. 1-28 illustrate the inventive attachment apparatus and method for using same. As described previously, the attachment apparatus and method for using it, is applicable to a wide variety of attachment opportunities but will be disclosed herein in the context of a firearms holster. The reader should understand that the invention is not limited to the application of a holster for firearms but in fact is much broader.

Figure 1:
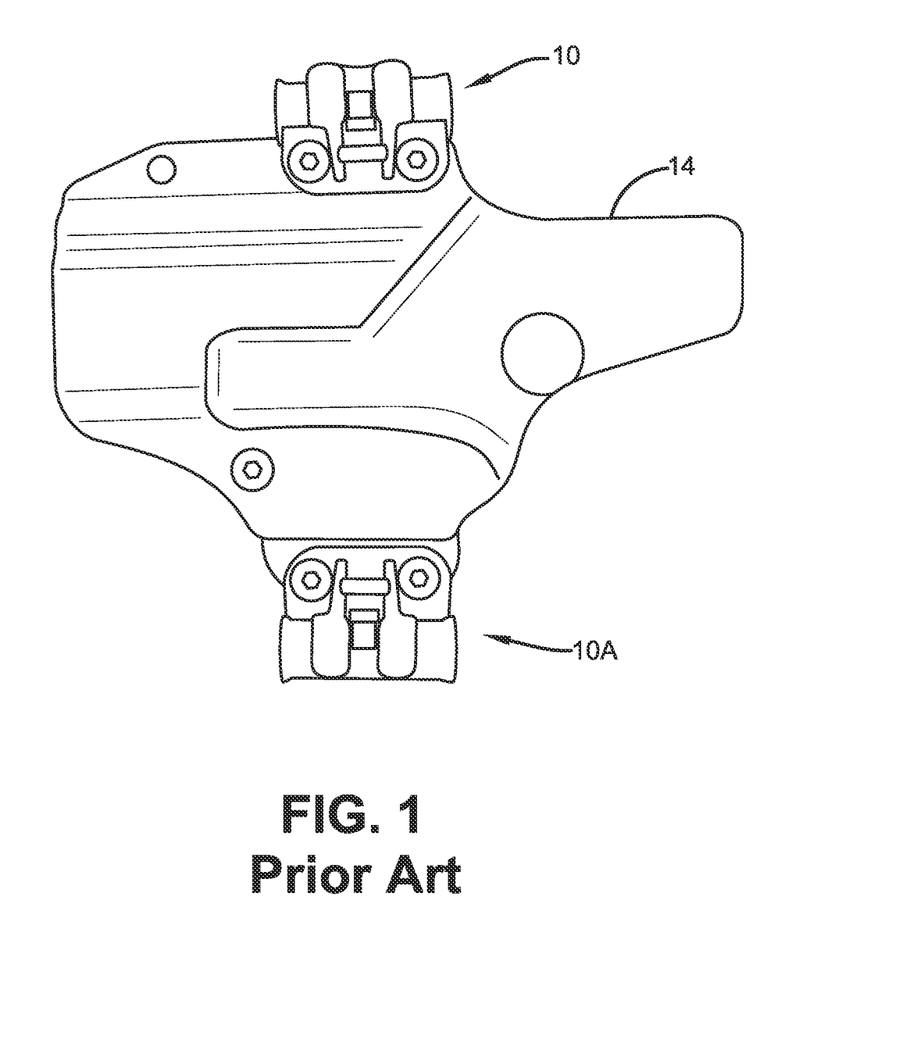
FIG. 1 is a front view of an apparatus according to the invention, as shown in connection with a holster.
Figure 2:
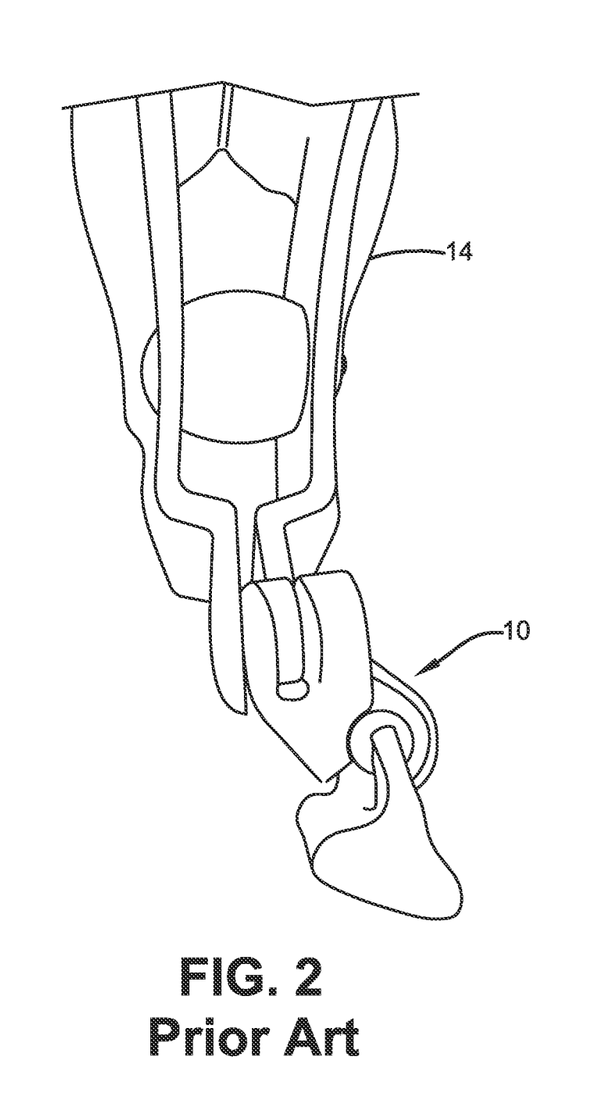
FIG. 2 is an end view of the holster and attachment apparatus.

With reference to FIGS. 1 and 2, two view of a firearms holster with the attaching apparatus 10, 10A as shown. In the preferred holster application, the attaching apparatus 10 is mounted on either side of the holster 14 but for clarity, one attaching apparatus 10, 10A has been labeled with reference number 10, while the other has been labeled with reference number 10A. However, the two attaching apparatuses 10, 10A are identical other than their location on the holster 14.

Figure 3:
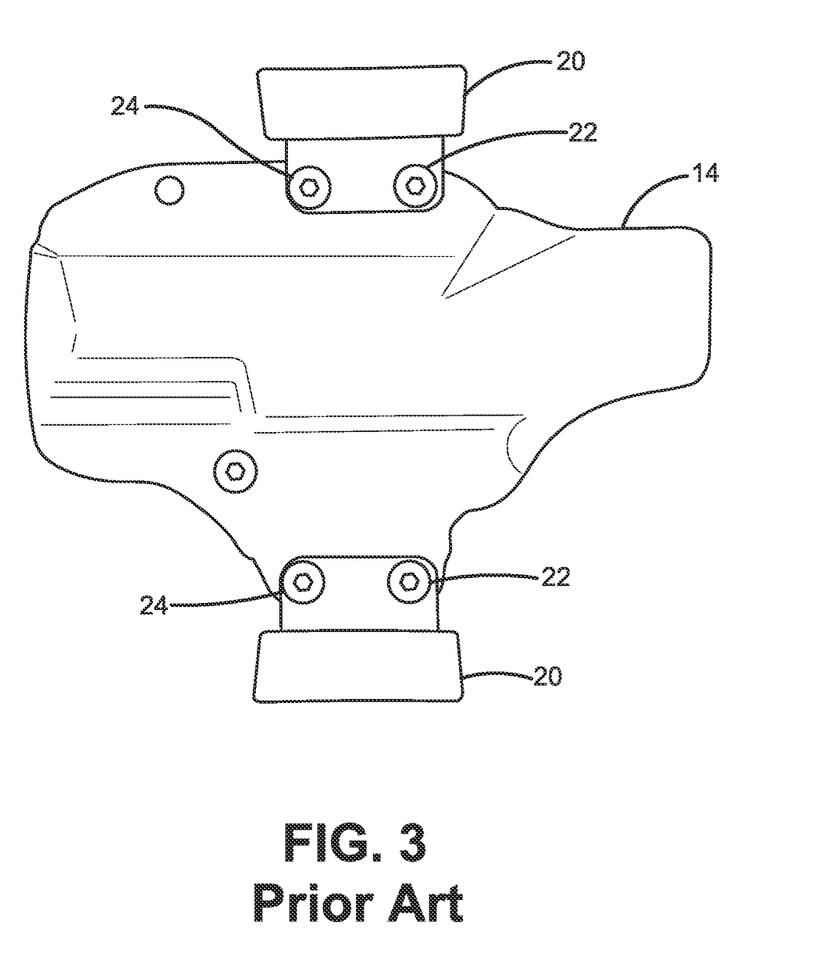
FIG. 3 is a front view of a prior art holster and attachment apparatus.
Figure 4:
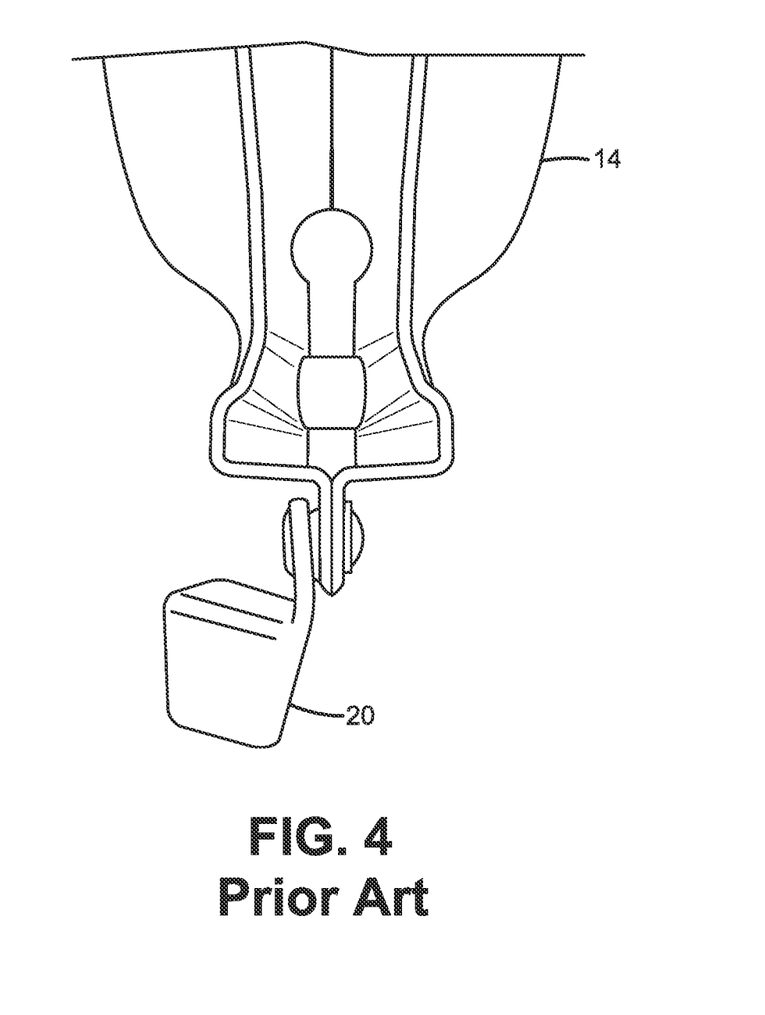
FIG. 4 is an end view of a prior art holster and attachment apparatus.

For reference sake, with reference to FIGS. 3 and 4, the prior art holster and apparatus method as shown, note the prior art attachment mechanism 20 is secured to the holster 14 via screws 22 and 24. While a variety of attachments might be desirable to selectively attach to a holster, in the prior art, the way such attachments were made was by conventional fasteners, such as the screws 22, 24, as shown, or bolts and nuts (not shown) and the application of a associated tool, such as a screwdriver or wrench (not shown) to loosen the screws, replace or add the attaching apparatus, and then refastening the screws. One of the advantages of the present invention is the ability to attach and detach an attachment 100 without the use of tools, quickly and selectively.

Figure 5:
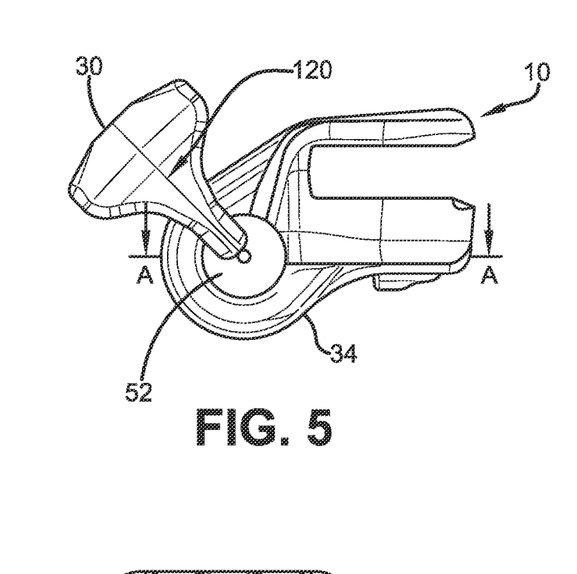
FIG. 5 is a schematic side view of the attachment apparatus shown in a first position, with the axle member of the first member aligned with the slot and the cylindrical channel.
Figure 6:
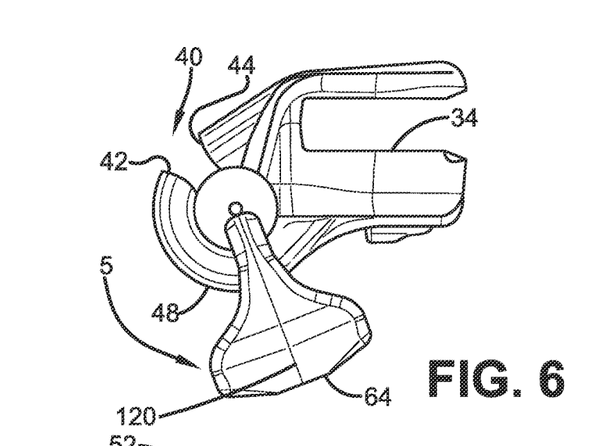
FIG. 6 is a schematic side view of the attachment apparatus shown in a second position.
Figure 7:
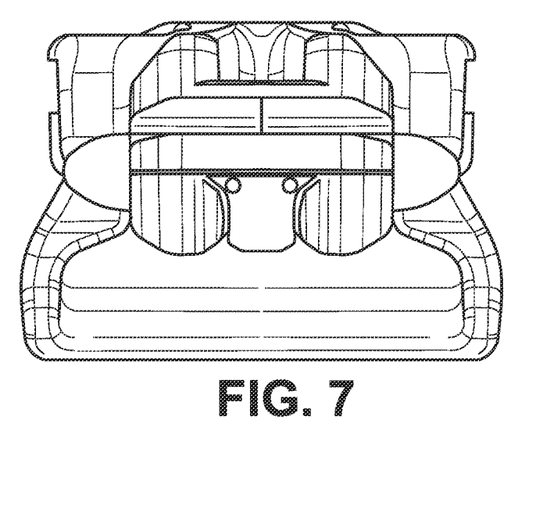
FIG. 7 is a schematic front view of the attachment apparatus.
Figure 8:
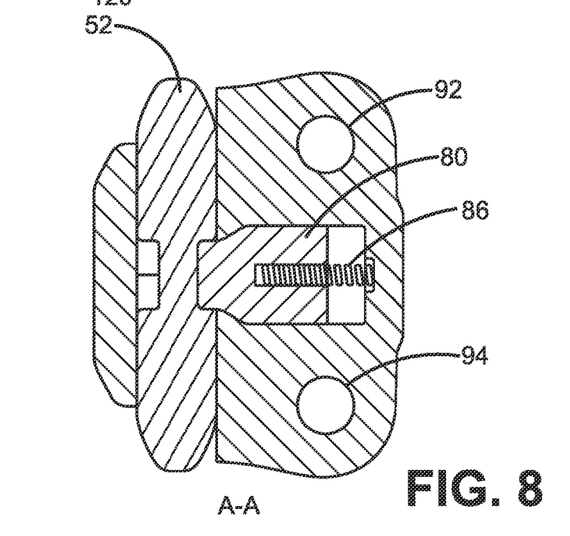
FIG. 8 is a schematic end view of the attachment apparatus.
Figure 9:
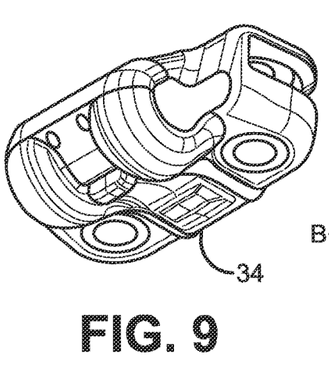
FIG. 9 is a schematic perspective view of an attachment apparatus.
Figure 10:
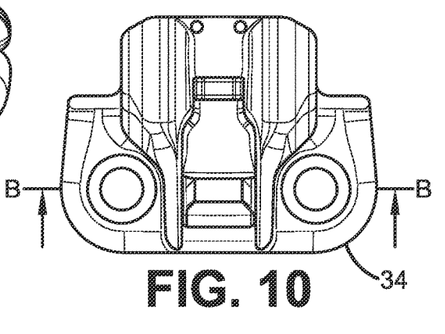
FIG. 10 is a schematic front view of an attaching apparatus.
Figure 11:
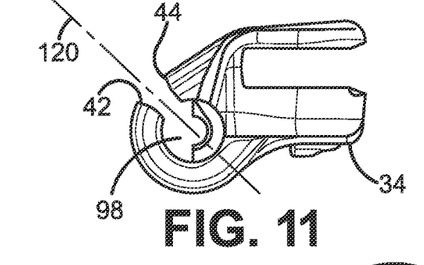
FIG. 11 is a schematic side view of an attachment apparatus.
Figure 12:
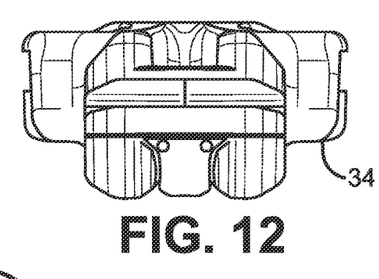
FIG. 12 is a schematic end view of an attaching apparatus.
Figure 13:
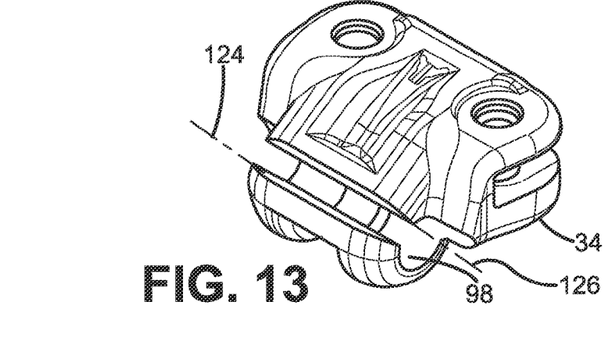
FIG. 13 is a schematic perspective bottom view of an attachment apparatus.
Figure 14:
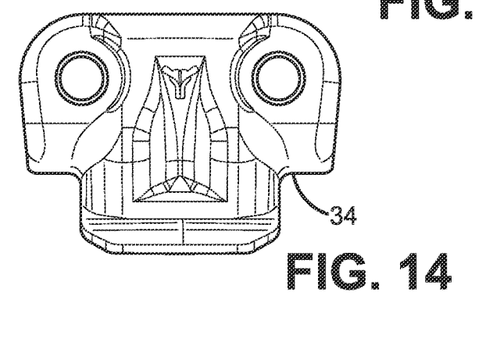
FIG. 14 is a schematic back view of an attachment apparatus.
Figures 15, 16:
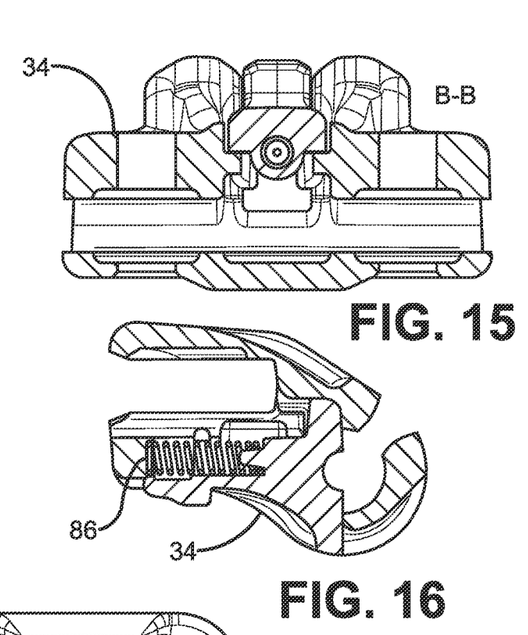
FIG. 15 is a schematic top view of an attachment apparatus.
FIG. 16 is a schematic end view of an attachment apparatus.

With reference to FIGS. 5-8 and FIG. 13, the attaching apparatus 10 will be described. The attaching apparatus 10 includes a first member 30 and a second member 34. With reference to specially to FIGS. 5 and 6, note that the first member 30 is shown in a first position in FIG. 5 and a second position in FIG. 6. Note that the second member 34 has a slot 40 to defined by a first sidewall 42 and a second sidewall 44. The slot 40 has a center plane 120. In the preferred embodiment, the first and second sidewalls 42, 44 line in planes 124, 126, respectively, and the planes 124, 126 are not parallel, but are configured so that near the outer surface 48 of the second member 34, the distance between the first sidewall 42 and the second sidewall 44 is larger than at a position more toward the interior of the second member 34.

With reference to FIGS. 9-16, the attaching apparatus 10 will be further described. Second member 34 is illustrated in different orientations.

Figure 17:
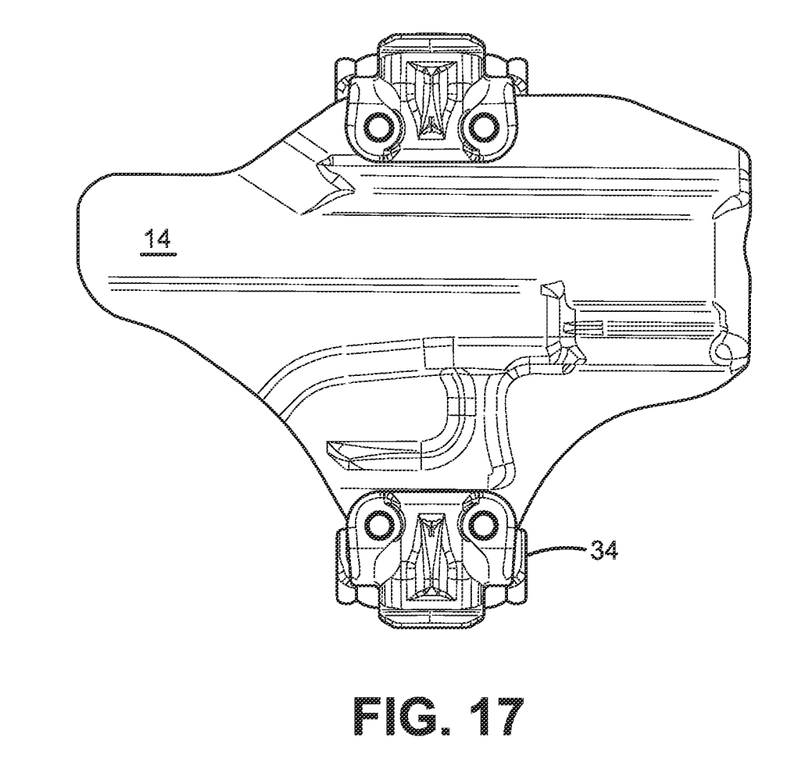
FIG. 17 is a schematic front view of a holster and attachment apparatus.
Figure 18:
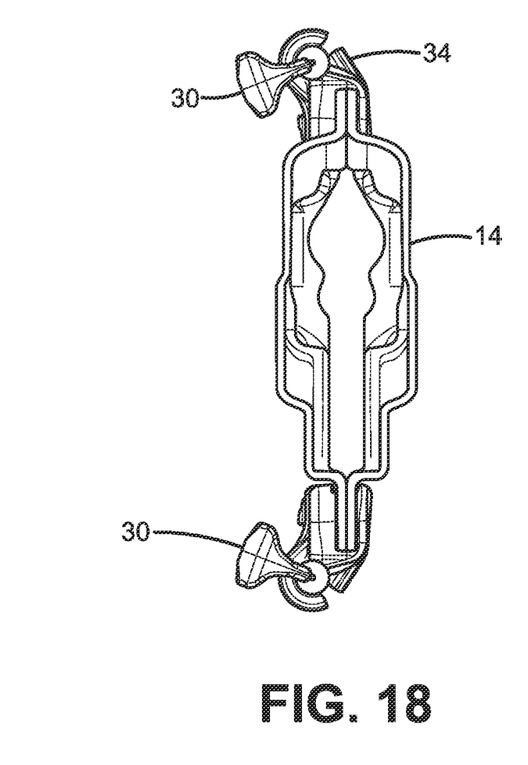
FIG. 18 is a schematic end view of an attachment apparatus shown in the context of a firearm holster.

With reference to FIGS. 17-18, the attaching apparatus 10 will be further described. First member 30 and second member 34 is illustrated in different orientations in the context of being used on an associated holster 14.

Figure 19:
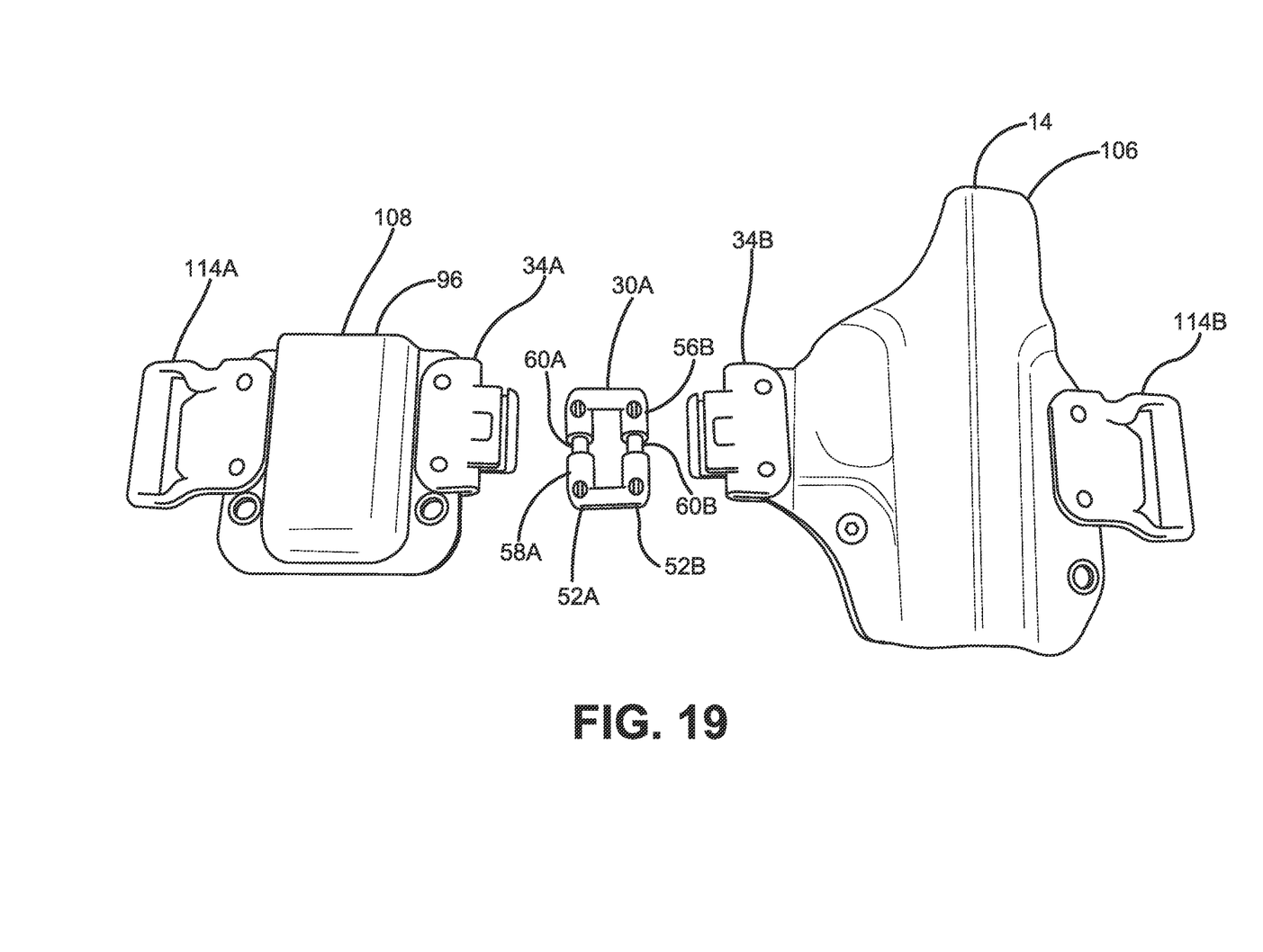
FIG. 19 is a top view of a holster, attachment apparatus, and attachment shown disassembled or unattached.

With reference to FIG. 19, the attaching apparatus 10 will be further described, with a holster 14 and container 96 being shown in a first, detached position. Second members 34A, 34B are shown in the contexts of being attached to an associated holster 14 and to an associated container 96 for receiving an ammunition clip (not shown). The associated container, however, could be any sort of attachment 100 the user would desire to attach to another item, such as the holster. The invention should be understood to not be limited to attaching associated containers 96 for ammunition clips to holsters 14, but rather a method and apparatus for selectively attaching and detaching a first associated item 106 to a second associated item 108.

With continuing reference to FIG. 19, the holster 14 has a second member 34 attached at one end. At another end, the holster 14 has as a connector 114B that can receive an associated belt and thereby attach the holster to the hip of an associated user. The container 96 also has a second member 34A attached at one end and at another end the container 96 has a connector 114A that can receive an associated belt (not shown) and thereby attach the holster 14 to the hip of an associated user.

With continuing reference to FIG. 19, a first member 30 is shown, but in this embodiment, the first member 30A is configured to selective attach and detach with both second members 34, 34A of the holster 14 and the container 96. In this embodiment of the first member 30A, first member 30A features an axle member 52A which comprises first and second cylinder portions 56A and 58A as well as 60A. In addition, first member 30A features an axle member 52B which comprises first and second cylinder portions 56B and 58B as well as 60B.

Figure 20:
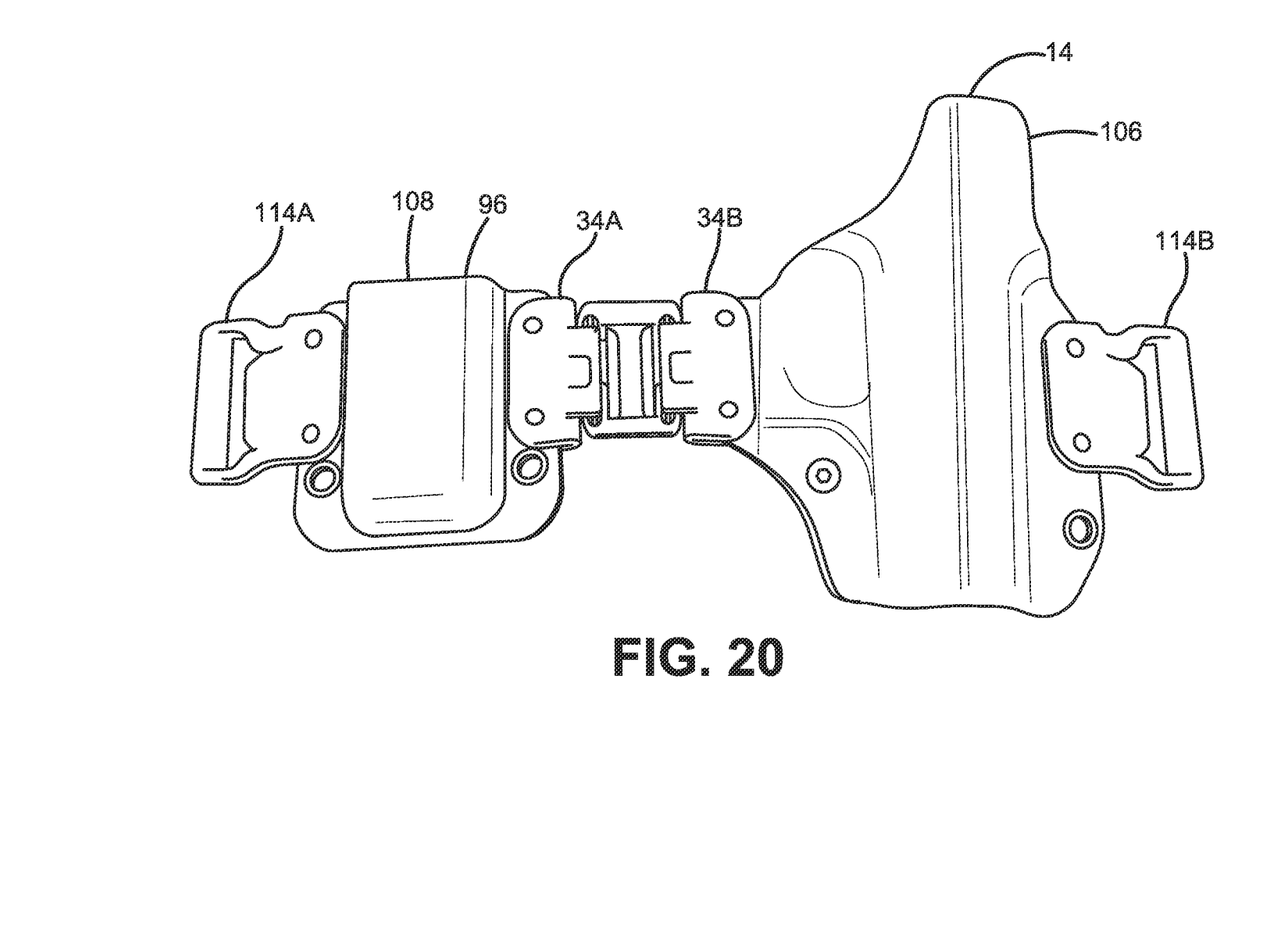
FIG. 20 is a top view of a holster, attachment apparatus, and attachment shown assembled or attached.
Figure 21:
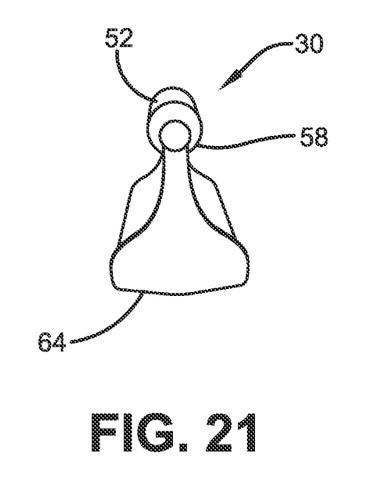
FIG. 21 is an end view of a first member.
Figure 22:
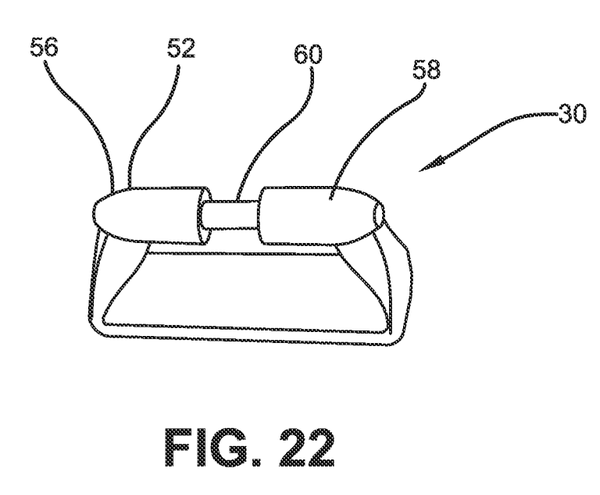
FIG. 22 is a side view of a first member.

With reference to FIG. 20, the holster 14 and container 96 are shown in a second, attached position, via the operative connection of first members 30, 30A and second members 34A, 34B.

Figure 23:
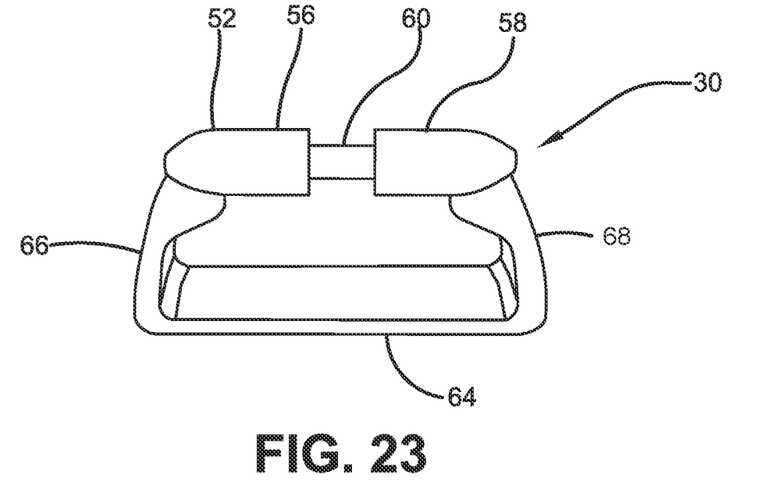
FIG. 23 is a side view of a member.
Figure 24:
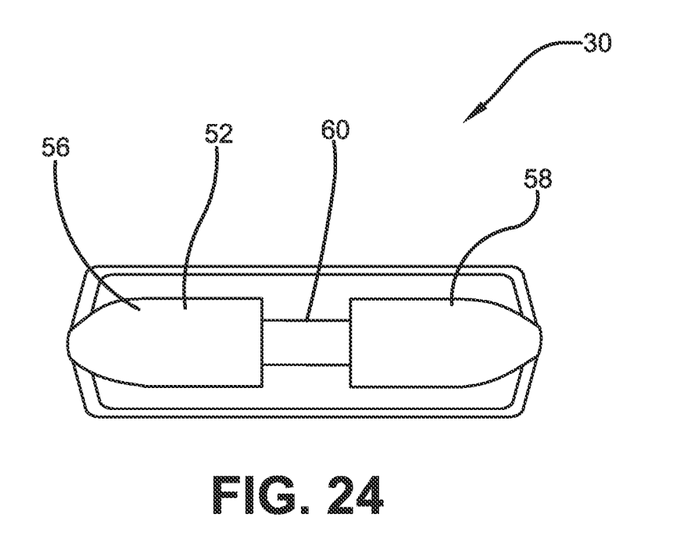
FIG. 24 is a top view of a member.

With reference to FIGS. 21-28, the first member 30 will be further described. The first member 30 has an axle member 52. The axle member 52 has a generally constant diameter and cylindrical shape except for a portion near the middle which has a reduced diameter. With reference especially to FIG. 23, the axle member 52 has a first cylindrical portion and a second cylindrical portion 58. The diameters of the first cylindrical portion 56 and second cylindrical portion 58 are approximately equal. However, fits therebetween the first cylindrical portion 56 and the second cylindrical portion 58 is a third portion 60.

With continuing reference to FIG. 23, the first member 30 provides exemplary information as to how an attachment may be conveniently attached to a holster 14 or other member, via inventive apparatus. For example, the first member 30 features an outer member 64, which is illustrated as basically flat and planar but could be attached to anything desired to be attached to the holster 14. For example, the outer member 64 could be a surface of an auxiliary gun clip. In the preferred embodiment shown herein, the first member 30 features the axle member 52 which comprises first and second cylinder portions 56 and 58 as well as 60. The axle member 52 is connected to the outer member 64 via first and second side members 66 and 68.

Figure 25:
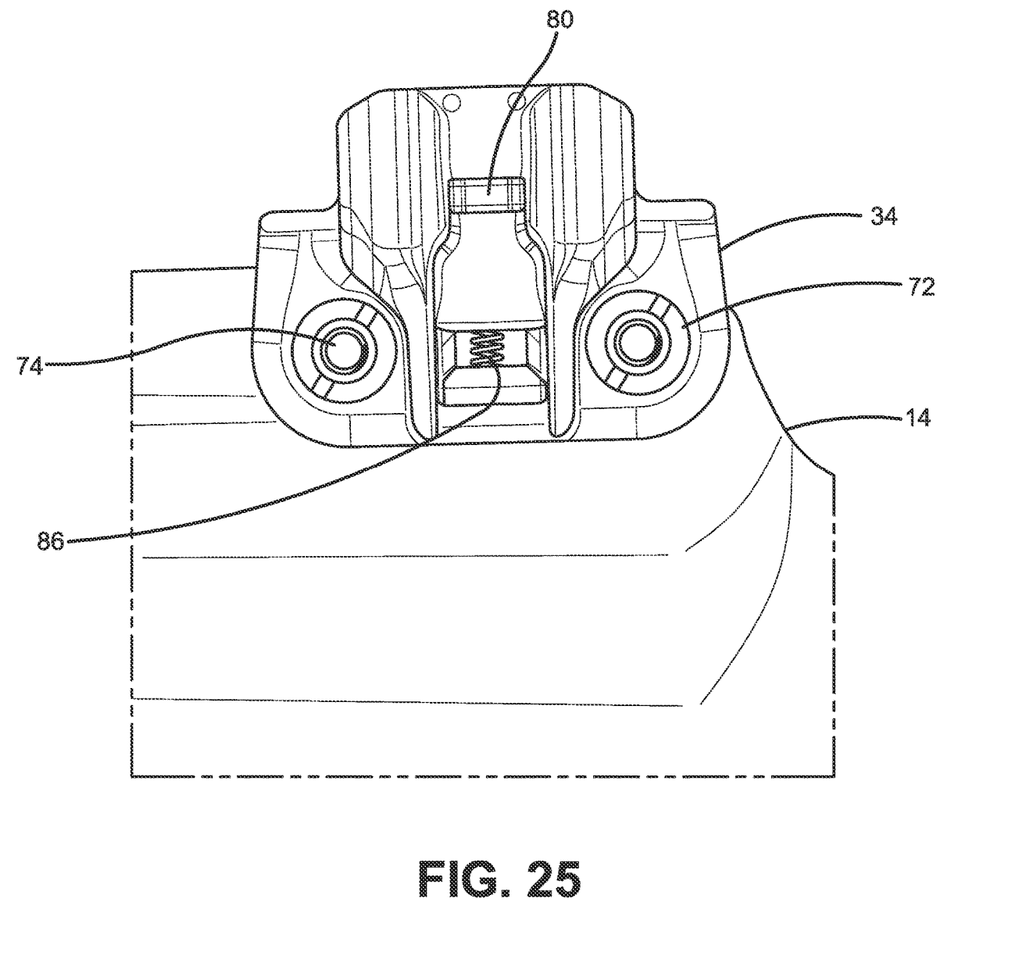
FIG. 25 is a view of a second member and a spring.
Figure 26:
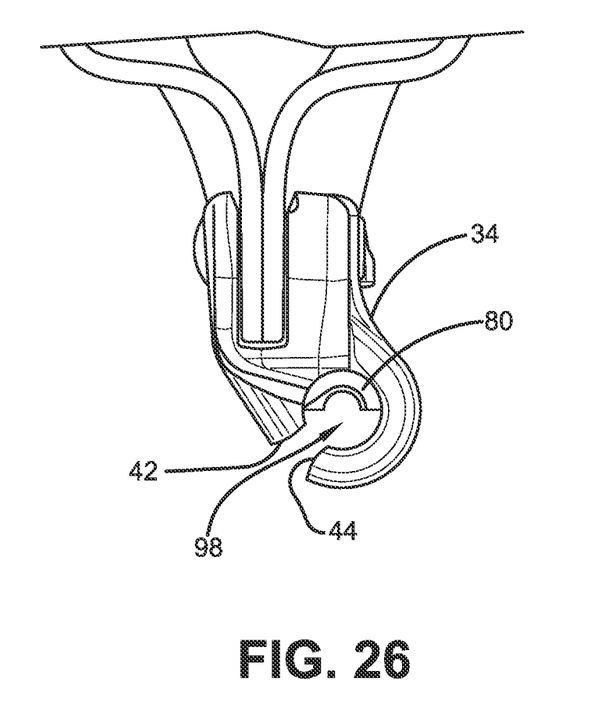
FIG. 26 is an end view of a second member, showing the cylindrical channel and the grip.

With reference to FIGS. 5-8 and 25-28, the interaction and operation of the first member 30 and the second member 34, as well as the method of using the attaching apparatus as well as using the attaching apparatus, will be described. With reference to FIG. 25, the second member 34 is attached to the holster 14 via conventional fasteners, such as screws 72, 74. Screws 72, 74 fit into holes 92, 94. A grip 80 is shaped somewhat like a claw or a hook or a "C" and selectively and operatively engages third portion 60. In the preferred embodiment, the grip 80 is biased into a first position 82 by spring 86.

Figure 27:
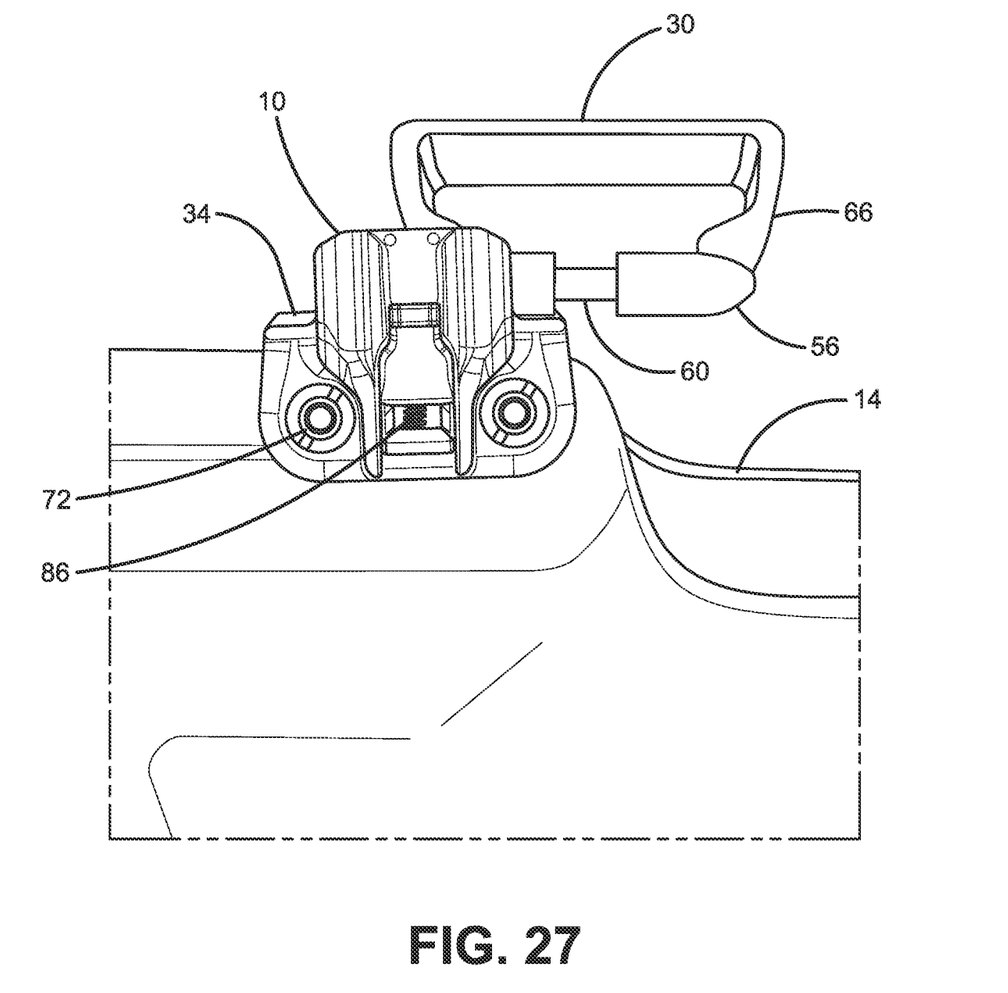
FIG. 27 is a front view of the first member partially inserted into said second member with the spring shown a depressed position.
Figure 28:
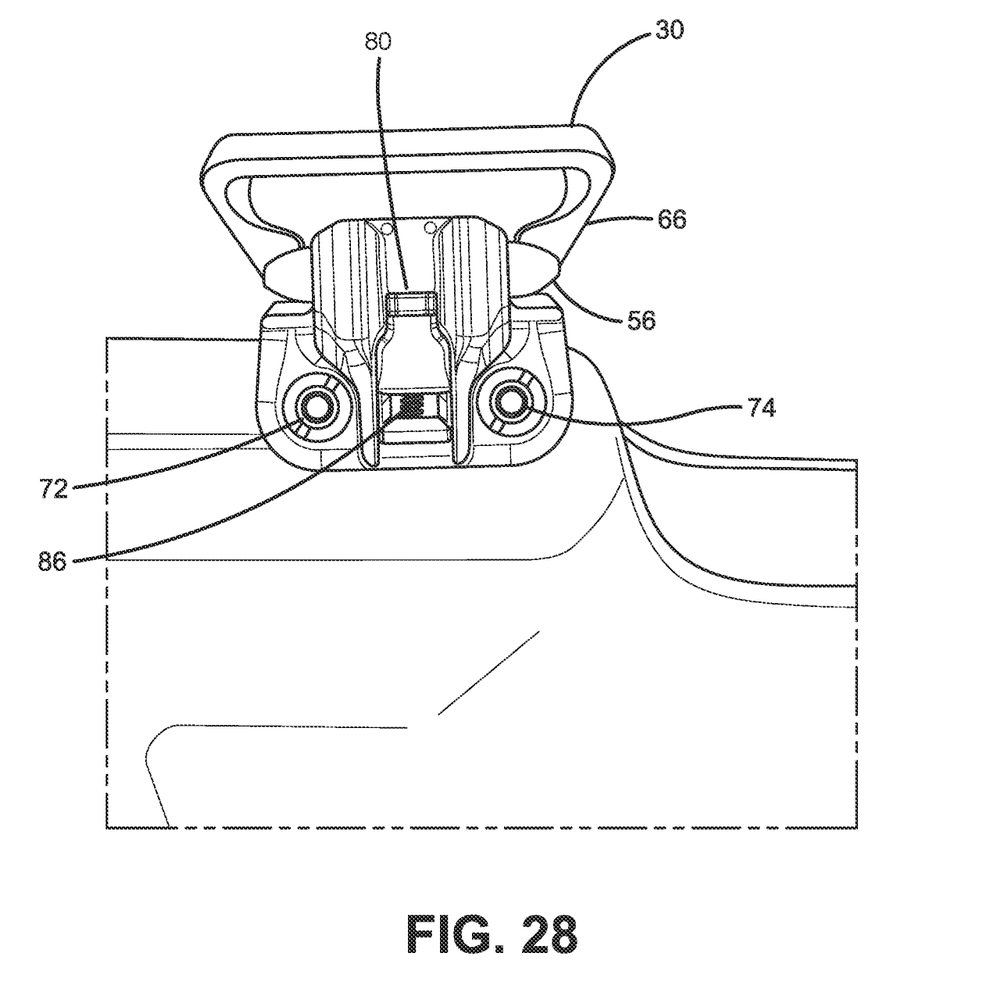
FIG. 28 is a front view of the first member fully inserted into said second member with the spring shown in an extended position.

With reference to FIGS. 27 and 28, the process of attaching the first member 30 to the second member 34 is illustrated. In FIG. 27, the first member 30 is in the process of being inserted into its position within the second member 30. Note that the grip 80 is into a second, non-engaged position and the spring 86 is depressed. The grip 80 is being displaced by the second cylindrical portion 58 of the axle member 52. The diameter of the first and second cylindrical portions of the axle member 52 are greater than the diameter of third portion 60.

With continuing reference to FIGS. 25-28, as the grip 80 is depressed, such as with the user's fingertip, and the first member 30 is slid within the cylindrical channel 98 of the second member 34, the first cylindrical portion 56 slides by the grip 80 until the third portion 60 is positioned at the same position occupied by the grip 80. Then, the grip is released (by removing the fingertip pressure which depresses the spring 86) and the grip moves from a second, depressed position to the first position 82 as shown in FIGS. 25 and 28. In FIG. 25, the first member 30 is not located within the cylindrical channel 98 but in FIG. 28, the first member 30 is so positioned. Thereby, the grip 80 fits into the area between an outer diameter of a first cylindrical portion 56 and the second cylindrical portion 58 and the outer surface of the third portion 60 of the axle member 52. When the grip slides into an operable engagement with the third portion 60, the first member 30 is selectively attached to the second member 34. While in this attached position, the first member 30 can freely rotate around its axle member 52 while the axle member 52 is contained rotatably within the cylindrical channel 98.

Therefore, a method of selectively attaching and detaching attachment to a first member, includes the steps of attaching a first item to second item, the method comprising the steps of providing a first member, said first member having an axle member; providing a second member, said second member having slot, a cylindrical channel, and a grip operative associated with a spring and moveable between a first extended position and a second compressed position; aligning said axle member of said first member with said slot; depressing said spring to said second depressed position, inserting said axle member into said cylindrical channel; releasing said spring so that it returns to said first extended position; positioning said grip onto said axle member to secure said axle member within said cylindrical channel.

Numerous embodiments have been described herein. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof. Further, the "invention" as that term is used in this document is what is claimed in the claims of this document. The right to claim elements and/or sub-combinations that are disclosed herein as other inventions in other patent documents is hereby unconditionally reserved.

Having thus described the invention, it is now claimed:

I claim:

1. An attaching apparatus, comprising:
a first member, said first member having an axle member, said axle member having first and third portions, a diameter of said first portion being greater than a diameter of said third portion; and,
a second member, said second member having a slot, said slot being defined by a first sidewall and second sidewall, said first and second sidewalls each lying in planes which are not parallel; said second member having a cylindrical channel, said slot having a center plane and said cylindrical channel having a longitudinal centerline, said centerline of said cylindrical channel lying within said center plane of said slot, said cylindrical channel selectively receiving said axle member.

2. A method of attaching a first item to second item, the method comprising the steps of:
providing a first member, said first member having an axle member;
providing a second member, said second member having slot, a cylindrical channel, and a grip operative associated with a spring and moveable between a first extended position and a second compressed position;
aligning said axle member of said first member with said slot;
depressing said spring to said second depressed position, inserting said axle member into said cylindrical channel;
positioning said grip onto said axle member to secure said axle member within said cylindrical channel.

3. An attaching apparatus comprising:
a first member, said first member having an axle member, said axle member having first, second and third portions, a diameter of said first and second portions being equal and being greater than a diameter of said third portion; and,
a second member, said second member having slot, said slot having a center plane, said slot being defined by a first sidewall and second sidewall, said first and second sidewalls each lying in planes which are not parallel; said second member having a cylindrical channel having a longitudinal centerline, said longitudinal centerline of said cylindrical channel lying within said center plane of said slot, said second member having a grip operatively associated with a spring and moveable between a first extended position and a second compressed position, said grip operatively associated with said third portion of said axle member of said first member and biased by said spring to said first extended position, said spring being compressible by manually-generated forces to a second, compressed position, said cylindrical channel capable of selectively receiving said axle member.

4. The attaching apparatus of claim 1, wherein the slot extends between an interior and an outer surface of the second member, wherein the first and second sidewalls are configured so that the distance between the first sidewall and the second sidewall is larger at the outer surface than at the interior of the second member.

5. The attaching apparatus of claim 1, wherein the first member and the second member are used on an associated holster for a firearm.

* * * * *